March 12, 1946.                    C. M. HINES                    2,396,422
                              AIR RAID WARNING SYSTEM
                        Filed April 30, 1942           2 Sheets-Sheet 1

INVENTOR
Claude M Hines
BY
                ATTORNEY

March 12, 1946.  C. M. HINES  2,396,422
AIR RAID WARNING SYSTEM
Filed April 30, 1942  2 Sheets-Sheet 2

INVENTOR
Claude M Hines
BY
ATTORNEY

Patented Mar. 12, 1946

2,396,422

UNITED STATES PATENT OFFICE 2,396,422

AIR RAID WARNING SYSTEM

Claude M. Hines, Pittsburgh, Pa., assignor to The Westinghouse Air Brake Company, Wilmerding, Pa., a corporation of Pennsylvania Application April 30, 1942, Serial No. 441,197

7 Claims. (Cl. 177—8)

This invention relates to air raid warning systems and has particular relation to automatic control equipment for selectively producing any one of a plurality of different coded signals, indicative of "air raid," "all clear," and the like.

In the copending joint application of Robert A. Mitchell and the present applicant Claude M. Hines, now Patent 2,381,224, issued August 7, 1945, there are disclosed air raid warning systems for automatically and selectively controlling the operation of warning devices, such as air operated or electrically operated horns, to produce different coded signals indicative of "air raid" and "all clear." The apparatus in this copending application includes a signal coding and timing device which is operated by an air engine.

It is an object of my present invention to provide an air raid warning system of the type disclosed in the above-mentioned copending application and characterized by signal coding and timing apparatus not requiring an air engine for operation.

More specifically, it is an object of my present invention to provide an air raid warning system of the type indicated in the foregoing object and including signal coding and timing apparatus differing specifically from that in the aforementioned Patent 2,381,224.

Figure 1:
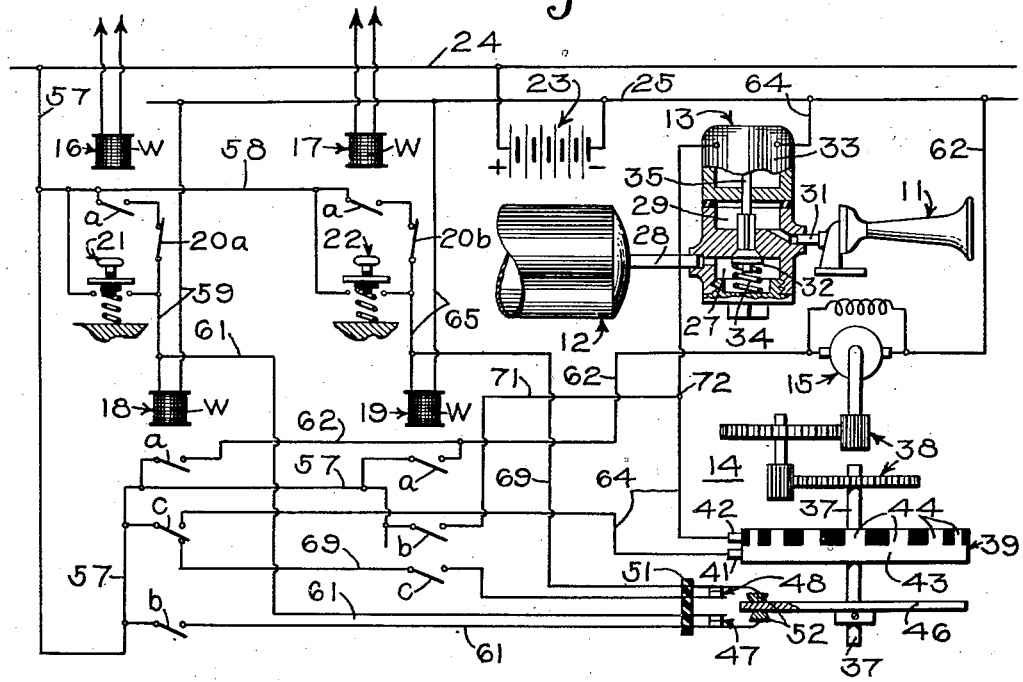
Figure 2:
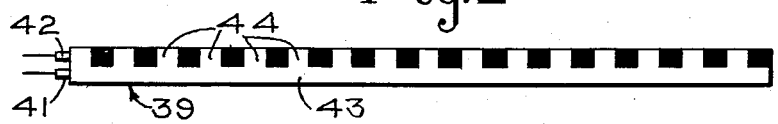
Figure 4:
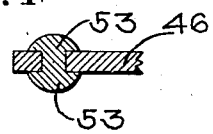
Figure 3:
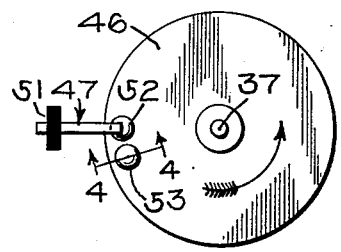
Figure 5:
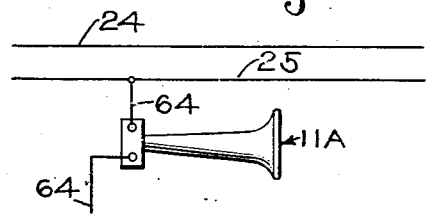
Figure 6:
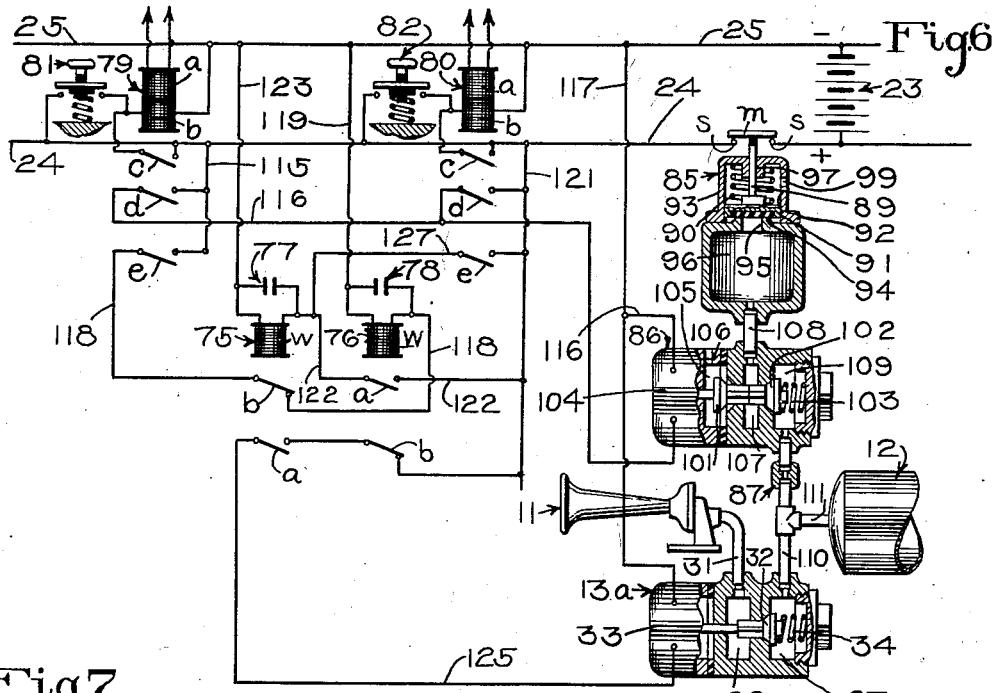
Figure 7:
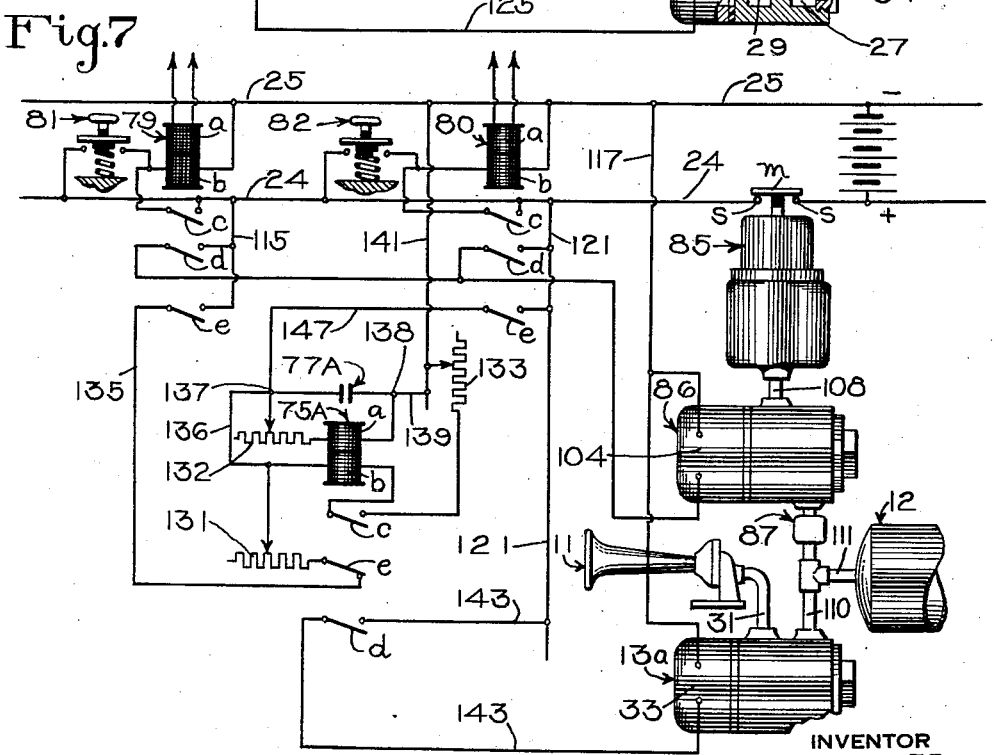

The above objects and other objects of my invention which will be made apparent hereinafter are attained by apparatus subsequently to be described, and shown in the accompanying drawings, wherein:

Fig. 1 is a diagrammatic view showing an air raid warning system embodying my invention, Fig. 2 is a development view of the commutator which is a part of the signal coding apparatus disclosed in Fig. 1, Fig. 3 is an end view of the coding and timing apparatus shown in Fig. 1, showing further details of construction, Fig. 4 is a fragmental enlarged sectional view taken on the line 4—4 of Fig. 3, showing a further detail of construction, Fig. 5 is a fragmental diagrammatic view showing a modification of the system of Fig. 1, in which an electrically operated signal device is employed rather than an air operated signal device, Fig. 6 is a diagrammatic view showing another embodiment of my invention and including a different type of signal coding and timing apparatus from that shown in Fig. 1, and Fig. 7 is a diagrammatic view showing a modification of the embodiment shown in Fig. 6.

Description of system shown in Fig. 1

The system shown in Fig. 1 comprises an audible signal device in the form of an air operated horn 11; a source of air under pressure such as a reservoir 12 which is charged to a certain operating pressure such as one-hundred pounds per square inch, by a suitable air compressor not shown; a magnet valve device 13 for controlling the supply of air from the reservoir 12 to the horn 11; a signal coding and timing device 14 for controlling the operation of the magnet valve device 13; an electric motor 15 for operating the signal coding and timing device 14; and additional control apparatus including two remotely controlled relays 16 and 17, two additional relays 18 and 19, respectively, controlled by the relays 16 and 17, two push button switches 21 and 22, and two additional switches 20a and 20b. The equipment further includes a suitable source of direct-current such as a storage battery 23, the positive and negative terminals of which are respectively connected to two bus wires 24 and 25, hereinafter respectively referred to as the positive bus wire and the negative bus wire.

Considering the parts of the equipment in greater detail, the air operated horn 11 may be of the type shown in Patent 2,263,342 to Norman F. Lewis, in which the vibration of a sound-producing diaphragm is effected in response to the continuous supply of air under pressure to the horn. The particular construction of the horn 11 is, however, not material to my invention inasmuch as any horn device operated in response to the supply of air under pressure thereto may be employed.

The magnet valve device 13 may be any standard type. As diagrammatically shown, it may comprise a suitable casing having a chamber 27 to which the reservoir 12 is constantly connected by a pipe 28, a chamber 29 to which the horn 11 is constantly connected the pipe 31, a valve 32 of the poppet type controlling communication between the chambers 27 and 29, and a magnet winding 33 for operating the valve 32.

The valve 32 is normally urged upwardly to a seated position, closing communication between the chambers 28 and 29, by a coil spring 34 and unseated downwardly in response to energization of the magnet winding 33 by means of a suitable plunger 35 actuated by the magnet winding.

It will thus be seen that when the magnet winding 33 is deenergized, the supply of air to the horn 11 is cut off and the horn is silent. It will also be seen that whenever and as long as the magnet winding 33 is energized, air under pressure is supplied to the horn 11 to cause it to produce an audible signal or blast.

It is preferable to employ a horn which is not directionally selective. Obviously, if directionally selective horns are employed, then a plurality of horns each pointed in a different direction may be connected, in multiple, to the pipe 31.

The signal coding and timing device 14 comprises a rotary shaft 37 suitably mounted for rotation in a supporting casing, not shown, and adapted to be rotated at a suitable speed by the motor 15 through a speed reduction gear mechanism 38. The shaft 37 is effective upon rotation to cause operation of a coding switch formed by a commutator 39 fixed on the shaft and two stationarily supported insulated brushes 41 and 42 associated therewith. The commutator 39 may comprise a suitable disk of insulating material carrying on the outer periphery thereof a continuous contact ring 43 from which a desired number of contact fingers 44 projects axially in regular spaced relation circumferentially (see Fig. 2). The surfaces of the contact ring 43 and contact fingers 44 are flush with the portion of the insulating disk between the respective contact fingers, thereby forming a smooth contact face for the commutator.

The brushes 41 and 42 are supported in insulated relation by a suitable brush holder in such a manner that the brush 41 continuously engages the contact ring 43 and the brush 42 engages the contact fingers 44 successively upon rotation of the commutator 39.

Brushes 41 and 42 are thus periodically connected and disconnected for substantially equal intervals of time, respectively, upon rotation of the commutator 39 at a constant speed.

The motor 15 is indicated as of the direct-current shunt field type and rotates at substantially constant speed in response to a predetermined voltage impressed thereon, thereby causing rotation of the shaft 37 at a predetermined selected speed. The speed of rotation of shaft 37 is such that the commutator 39 completes one full revolution in a certain length of time, such as two minutes.

The brushes 41 and 42 are thus connected and disconnected alternately for predetermined and substantially equal intervals of time, the length of which depends upon the number of contact fingers 44 and the corresponding number of insulating segments between the commutator fingers 44. Thus, as shown in Fig. 2, the commutator 39 has sixteen contact fingers 34 and a corresponding number of insulating segments between the contact fingers. Assuming a complete revolution of the shaft 37 and commutator 39 in two minutes, it will be seen that the brushes 41 and 42 are connected and disconnected alternately for approximately three and three-quarters seconds.

It will be apparent that the width of the contact fingers 44 with respect to the insulating segments between the contact fingers may be varied so that the length of time that the brushes 41 and 42 are connected with respect to the length of time that they are disconnected may correspondingly vary.

The coding and timing device 14 further comprises a timing switch device including a rotary cam disk 46 fixed on the shaft 37 and rotatable therewith and two switches 47 and 48 of the telephone type associated therewith and operated thereby.

Each of the switches 47 and 48 comprises a pair of contact fingers having contacts which are normally biased into contact with each other, the contact fingers of the two switches being carried in insulated relation by a suitable support 51. One of the contact fingers of the switch 47 and a corresponding one of the contact fingers 48 are extended and provided with a suitable insulating button 52 on the end thereof which slidably engages a corresponding face of the cam disk 46.

At one point adjacent the periphery of the cam disk 46 are two cams 53 which are in axial alignment on opposite faces of the cam disk, as shown in Fig. 4. The cams 53 may be formed in a convenient manner by a single element in the form of a rivet extending through a suitable hole in the cam disk 46 and having the opposite ends suitably rounded to form the cams 53.

The cams 53 are located the same radial distance from the axis of rotation of the shaft 37 as are the insulating buttons 52 on the contact fingers of the switches 47 and 48. It will thus be seen that as the cam disk 46 rotates through one certain position, the cams 53 engage the insulating buttons 52 to bend the corresponding contact fingers of the switches 47 and 48 outwardly from the corresponding faces of the cam disk to cause separation of the contacts carried by the contact fingers. After the cam disk 46 has passed through such certain position, the contacts of the two switches 47 and 48 reengage.

The cam disk 46 is fixed on the shaft 37 in such a manner as to cause opening of the switches 47 and 48 at a certain selected time in the manner hereinafter to be more fully explained.

The commutator 39 of the signal coding device 14 differs somewhat from that disclosed in the above mentioned Patent 2,381,224 of Robert A. Mitchell and Claude M. Hines for the reason that in the present application the commutator 39 rotates continuously whereas, in the patent, the commutator is alternately moved and stopped while being progressively shifted rotatively.

The relays 16 and 17 are standard direct-current relays of the neutral type, each having a winding W and a single front contact a. The windings W of the relays 16 and 17 are connected by suitable wires to a remote control station where they may be selectively energized and deenergized by an operator. Such remote control station may be a telephone exchange where an operator is always on duty.

The relays 18 and 19 are standard direct-current relays of the neutral type. Relay 18 has a winding W, two front contacts a and b, and a transfer contact c. Relay 19 has a winding W and three front contacts a, b, and c, respectively.

It will be understood that the term "front contact" refers to a contact which is in open position when dropped-out and in closed position when picked-up while the term "transfer" contact refers to a contact which is in one closed position when dropped-out and a different closed position when picked-up.

The push button switches 21 and 22 may be of any standard type requiring the application of manual pressure to close them and to maintain them closed, and being automatically opened upon the release of manual pressure.

The switches 20a and 20b may be of any single-pole, single-throw type, such as a knife switch or a snap switch of the rotary type. These switches will be hereinafter referred to as cutout switches because they are effective, when opened, to cut the relays 16 and 17 out of operation in the manner hereinafter to be pointed out.

*Operation of system shown in Fig. 1*

Let it be assumed that the operator at the remote control station desires to cause the horn 11 to signal an "air raid." To do so, he operates a switch (not shown) at the remote control station, thereby causing energization of the magnet winding W of the relay 16 for a short interval of time.

The contact a of the relay 16 is accordingly actuated to its picked-up or closed position and is effective in such position to establish a circuit for energizing the winding W of the relay 18. This circuit extends from the positive bus wire 24 by way of a branch wire 57, another branch wire 58, contact a of the relay 16, and a wire 59, including in series relation therein the cut-out switch 20a and the winding W of the relay 18, to the negative bus wire 25.

The contacts of the relay 18 are accordingly actuated to their picked-up position. The contact b of the relay 18 is effective in its picked-up or closed position to establish a self-holding circuit for the winding of the relay 18. This circuit extends from the positive bus wire 24 by way of the branch wire 57, a wire 61 including in series relation therein the contact b of the relay 18 and the switch 47 of the signal coding and timing device 14 to the wire 59, and thence through the winding W of the relay 18 to the negative bus wire 25.

It will thus be seen that once the relay 18 is picked-up it holds itself picked-up thereafter, thereby permitting the contact of the relay 16 to be restored to its dropped-out position. In other words momentary pick-up of the relay 16 causes the relay 18 to be picked-up and maintained picked-up thereafter until the happening of an event subsequently to be described.

The contact a of the relay 18 is effective in its picked-up or closed position to establish a circuit for energizing the motor 15. This circuit extends from the positive bus wire 24 by way of the branch wire 57, a wire 62 including in series relation therein the contact a of the relay 18 and the parallel-connected armature and field windings of motor 15, to the negative bus wire 25.

The motor 15 is accordingly rotated to cause rotation of the shaft 37 of the signal coding and timing device at a substantially constant speed.

The contact c of the relay 18 is effective in its picked-up position to establish a circuit for energizing the magnet winding 33 of the magnet valve device 13. This circuit extends from the positive bus wire 24 by way of the wire 57, contact c of the relay 18 in its picked-up position, a wire 64 including in series relation therein the signal coding switch, formed by the brushes 41 and 42 and the commutator 39, and the magnet winding 33 of the magnet valve device 13, to the negative bus wire 25.

It will thus be seen that the magnet valve device 13 is periodically operated to cause air under pressure to be supplied from the reservoir 12 to the horn 11 as the commutator 39 of the signal coding and timing device 14 continues to rotate. The horn 11 accordingly is operated to emit an audible blast or signal periodically for a length of time corresponding to the length of time that the brushes 41 and 42 are connected by the commutator 39. As previously explained, the brushes 41 and 42 are alternately connected and disconnected for substantially equal lengths of time of approximately three and three-quarter seconds. Thus the audible signals produced by the horn 11 are separated by silent intervals of substantially the same duration.

The horn 11 continues to operate to produce the coded signal, indicative of an "air raid," in the manner just described as long as the relay 18 remains picked-up. The relay 18 is restored to its dropped-out position due to the interruption of the self-holding circuit thereof in response to the opening of the switch 47 of the signal coding and timing device 14. The cam disk 46 is normally so positioned with respect to the switches 47 and 48 that the shaft 37 rotates through substantially a full revolution before the cams 53 on the cam disk 46 engage the insulating buttons 52 on the contact fingers of the switches 47 and 48 to cause opening of the switches. Accordingly, it will be seen that the relay 18 is not restored to its dropped-out position until the shaft 37 completes substantially one full revolution following the initial pick-up of the relay 18, thus automatically timing the duration of the signal sequence.

Upon restoration of the contact a of the relay 18 to its dropped-out or open position, the circuit previously traced for energizing the armature and field windings of the motor 15 is interrupted. Due to the inertia of the motor armature and the other rotating parts rotated thereby the motor armature rotates sufficiently long, after interruption of the energizing circuit in response to the restoration of the relay 18 to its dropped-out position, to insure the cams 53 on the cam disk 46 passing the switches 47 and 48 so as to reclose the switches before the shaft 37 is stopped. Obviously, once the contact b of the relay 18 is restored to its dropped-out or open position, the reclosure of the switch 47 is ineffective to restore the self-holding circuit for the winding of the relay 18 and consequently the relay 18 remains in its dropped-out position thereafter unless again picked-up in the manner previously described by operation of the relay 16 or by means of the push button switch 21 in the manner presently described.

If the local operator desires to cause operation of the horn 11 to produce the coded signal indicative of an "air raid" he may do so merely by momentarily closing the push button switch 21. The switch 21 is connected in parallel with the contact a of the remotely controlled relay 16 and accordingly is effective upon closure to cause pick-up of the relay 18 in the same manner as if the relay 16 is picked-up.

The operation of the equipment to produce a periodic blast of the horn 11 for a predetermined time is thus effected in the same manner as previously described and the description accordingly is not repeated.

If the local operator for any reason desires to cut the remotely controlled relay 16 out of operation he may do so merely by opening the cut-out switch 20a. The switch 20a, being in series with the contact a of the relay 16 and the winding of the relay 18, is effective when opened to render the pick-up of the relay 16 ineffective to cause pick-up of the relay 18.

Now let it be supposed that the operator at the remote control station desires to cause operation of the horn 11 to produce the "all clear" signal. To do so, he closes a switch for causing energization of the winding W of the relay 17, the contact a of which is accordingly actuated to its picked-up or closed position. The contact a of the relay 17 is effective in its pick-up position to cause energization of the winding W of the relay 19. This circuit extends from the positive bus wire 24 by way of the wires 57 and 58, contact a of the relay 17, and a wire 65 including in series relation therein the cut-out switch 20b and the winding W of the relay 19 to the negative bus wire 25. The contacts of the relay 19 are accordingly actuated to their respective pick-up or closed positions.

The contact b of the relay 19 is effective in its picked-up or closed position to establish a self-holding circuit for the winding W of the relay 19, thus permitting restoration of the contact of the relay 17 to its dropped-out position once the relay 19 is picked-up. This self-holding circuit for the winding of the relay 19 extends from the positive bus wire 24 by way of the wire 57, contact c of relay 18 in its dropped-out or closed position, and a wire 69 including in series relation therein contact b of the relay 19 and switch 48 of the signal coding and timing device 14 to the wire 65, and thence through the winding W of the relay 19 to the negative bus wire 25.

The contact a of the relay 19 is connected in parallel with contact a of the relay 18 and is therefore effective, in its picked-up position, to cause energization of the armature winding and field winding of the motor 15 in the same manner as does the contact a of the relay 18. Accordingly, the motor 15 starts to rotate the shaft 37 the instant the relay 19 is picked-up and continues to rotate it until such time as the relay 19 is restored to its dropped-out position in the manner presently to be described.

The contact b of the relay 19 is effective in its picked-up position to cause energization of the winding 33 of the magnet valve device 13 independently of the coding switch including the brushes 41 and 42 and commutator 39 of the coding and timing device 14. This circuit extends from the positive bus wire 24 by way of the wire 57, a wire 71 having in series relation therein contact b of the relay 19 to the wire 64 at a point 72 between the brush 42 and the winding 33 of the magnet valve device 13, thence by way of the wire 64 and winding 33 of the magnet valve device 13 to the negative bus wire 25.

It will thus be seen that although the shaft 37 continues to rotate, the signal coding switch formed by the brushes 41 and 42 and the commutator 39 is ineffective to control the magnet winding 33 of the magnet valve device 13, because in this instance it is controlled directly by the contact b of the relay 19.

Upon the pick-up of the relay 19, therefore, the magnet winding of the magnet valve device 13 is energized and the magnet valve device 13 accordingly operated to cause air under pressure to be supplied to operate the horn 11 continuously until such time as the relay 19 is restored to its dropped-out position.

The horn 11 accordingly operates to produce a continuous audible signal or blast, indicative of the "all clear" signal, until such time as the cam disk 46 of the coding and timing device 14 completes a full revolution from the time the relay 19 was initially picked-up. At the expiration of the time required for a full revolution of the cam disk 46, the switch 48 is opened momentarily in the manner previously described for the switch 47, thereby interrupting the self-holding circuit for the winding of the relay 19 and causing the contacts of this relay to be restored to dropped-out position.

Upon the restoration of the contacts of the relay 19 to their dropped-out positions, the magnet winding 33 of the magnet valve device 13 is deenergized, as is the armature winding and field winding of the motor 15. Accordingly, the supply of air to the horn 11 is cut-off and the audible signal produced thereby is terminated. At the same time, the motor 15 coasts to a stop promptly, in the manner previously described, so as to cause reclosure of the switch 48. Reclosure of the switch 48 renders the self-holding circuit for the winding of the relay 19 potentially effective again subject to subsequent pick-up of the relay 19.

If the local operator desires to cause operation of the horn 11 to produce a continuous blast indicative of the "all clear" signal, he may do so by momentarily closing the push button switch 22. The push button switch 22 is connected in parallel to the contact a of the relay 17 and consequently the momentary closure of the switch 22 operates in the same manner as if the relay 17 were picked-up. Accordingly, it is deemed unnecessary to describe the operation of the equipment in response to the closure of the switch 22.

If for any reason the local operator desires to cut the remotely controlled relay 17 out of operation, he may do so merely by opening the cut-out switch 20b. The cut-out switch 20b is connected in series with the contact a of the relay 17 and the winding of the relay 19 and is therefore effective in its open position to prevent the energization of the winding of the relay 19 by pick-up of the contact of the relay 17. At the same time, the opening of the cut-out switch 20b does not prevent pick-up of the relay 19 by operation of the push button switch 22.

*Modification shown in Figure 5*

Referring to Fig. 5, a modification of the equipment shown in Fig. 1 is disclosed in which an electrically operated horn 11A is employed rather than the air operated horn 11. In such case, the reservoir 12 is unnecessary and is therefore dispensed with. The equipment of Fig. 5 is thus substantially identical with that in Fig. 1 except that the electroresponsive element in the horn 11A is substituted for the magnet winding 33 of the magnet valve device 13 in the circuit including the wire 64 controlled either by the signal coding switch device 14 or contact b of the relay 19.

*Description of system shown in Figure 6*

The air raid warning system shown in Fig. 6 is similar to that in Fig. 1 in that it comprises an air operated horn 11, a source of air under pressure including the reservoir 12 and a magnet valve device 13a similar to magnet valve device 13, for controlling the supply of air under pressure from the reservoir 12 to the horn 11.

In other respects the system shown in Fig. 6 is substantially different from that in Fig. 1. The apparatus for controlling the operation of the horn 11 to produce a coded signal indicative of "air raid" or "all clear" comprises two coding relays 75 and 76 respectively, with which are associated two electrical condensers 77 and 78 respectively; two control relays 79 and 80; and two push button switches 81 and 82.

The apparatus for timing the duration of a coded signal sequence comprises a pneumatic timing switch device 85; a magnet valve device 86 controlling the operation of the timing switch 85; and a choke device 87 for controlling the rate of flow of air under pressure from the reservoir 12 to the timing switch 85.

Relays 75 and 76 may be of the direct-current neutral type. Each of these relays has a winding W, a front contact $a$ and a back contact $b$. The front contact of each relay is in open position when the winding of the relay is deenergized and is actuated to the picked-up or closed position when the winding of the relay is energized. The back contact $b$ of each relay is closed in the dropped-out position and is actuated to the picked-up or open position in response to energization of the winding of the relay.

The control relays 79 and 80 are identical, each having two operating windings $a$ and $b$, and three front contacts $c$, $d$, and $e$, respectively.

The winding $a$ of each of the relays is connected in a suitable circuit to a remote control station, such as a telephone exchange, and is effective when energized to cause pick-up of the contacts of the relay.

The winding $b$ of each of the relays 79 and 80 is a self-holding and pick-up winding effective when energized to either pick-up the contacts of the relay or maintain them picked-up if already actuated to the picked-up position.

When the contact $c$ of each of the relays 79 and 80 is actuated to its picked-up or closed position, it establishes a self-holding circuit for the winding $b$ of the corresponding relay which circuit extends from the positive bus wire 24 through the series-connected contact $c$ of the relay and the corresponding winding $b$ of the relay to the negative bus wire 25.

The push button switches 81 and 82 correspond to the push button switches 21 and 22 of Fig. 1 and are connected in parallel relation to the contact $c$ of the relays 79 and 80 respectively. It will accordingly be seen that closure of the switches 81 and 82 causes energization of the winding $b$ of the corresponding relays 79 and 80 to cause pick-up thereof, the winding $b$ being thereafter maintained energized due to the closure of the corresponding contact $c$ notwithstanding the subsequent opening of the switch 81 or 82.

The timing switch device 85, as diagrammatically shown, comprises a movable contact $m$ and two cooperating stationary insulated contacts $s$. The switch formed by the movable contact $m$ and stationary contacts $s$ controls connection of the positive bus wire 24 to the positive terminal of the battery 23. As shown, the movable contact $m$ is carried in insulated relation on a stem 89 of a piston 91 that operates in the bore 92 of a suitable casing member 93. A coil spring 90 interposed between one face of the piston 91 and the closed end of the casing 93 yieldingly urges the piston 91 into seated relation on an annular rib seat 94 surrounding a port 95 that opens into a suitable chamber or volume reservoir 96.

In the seated position of the piston 91, the movable contact $m$ engages the stationary contacts $s$, thereby connecting the positive bus wire 24 to the positive terminal of the battery 23.

Upon the supply of air under pressure to the volume reservoir 96 at a selected rate, in the manner presently to be described, a certain length of time is required to build-up sufficient pressure on the inner seated area of the piston 91 to overcome the force of the spring 90. When the piston 91 is unseated from the annular rib seat 94, the increased area of the piston 91 subject to the air pressure in the volume reservoir 96 causes the piston to be snapped suddenly upward to a limiting position determined by engagement with a boss 97 within the casing 93, thereby causing the movable contact $m$ to be suddenly disengaged from the stationary contacts $s$, that is, operated to open position.

A port 99 in the casing 93 serves to prevent dash-pot action of the piston 91 and the consequent delay in the opening of the switch.

The magnet valve device 86 controls the supply of air from the reservoir 12 to the volume reservoir 96. As shown, the magnet valve device 86 comprises two oppositely seating poppet valves 101 and 102 operated in one direction to unseated and seated positions respectively by a coil spring 103 and in the opposite direction to seated and unseated positions in response to energization of a magnet winding or solenoid 104.

The valve 101 is contained in a chamber 105 that is constantly open to atmosphere through an exhaust port 106 and its fluted stem extends through a suitable bore into a chamber 107 that is constantly connected by a pipe 108 to the volume reservoir 96.

The valve 102 is contained in a chamber 109 that is connected by a pipe 110 and a branch pipe 111 to the reservoir 12, the choke device 87 being interposed in the pipe 110 between the pipe 111 and the chamber 109. The fluted stem of the valve 102 extends through a suitable port into the chamber 107 and engages the end of the fluted stem of the valve 101 in end-to-end relation.

It will thus be apparent that when the winding 104 of the magnet valve device 86 is deenergized, the air under pressure in volume reservoir 96 is exhausted to atmosphere through the exhaust port 106 in the magnet valve device. It will also be apparent that when the magnet winding 104 of the magnet valve device 86 is energized, the exhaust communication just described is closed, due to seating of the valve 101, and a supply communication is opened due to the unseating of the valve 102 through which air under pressure is supplied from the reservoir 12 to the volume reservoir 96 at the controlled rate determined by the flow area of the choke device 87.

As previously indicated, the rate of supply of air under pressure to the volume reservoir 96 is so controlled by the choke device 87 that a certain length of time, such as two minutes, is required in order to build-up a sufficient pressure within the chamber 96 to cause upward unseating movement of the piston and the consequent opening of the contacts of the switch device 85.

*Operation of system shown in Figure 6*

Let it be assumed that the operator at the remote control station desires to cause operation of the horn 11 to produce a coded "air raid" signal, and that he accordingly causes the winding $a$ of the relay of the control relay 79 to be energized.

The contacts of relay 79 are accordingly actuated to their respective picked-up or closed positions in which the contact $c$ is effective to establish the self-holding circuit of the winding $b$ of the relay 79 in the manner previously indicated. The contacts of relay 79 accordingly remain picked-up notwithstanding the deenergization of the winding $a$ of the relay 79, until such time as the self-holding circuit for the winding $b$ of the relay 79 is interrupted in the manner hereinafter to be described.

The contact $d$ of the relay 79 is effective in its picked-up or closed position to establish a circuit for energizing the magnet winding 104 of the magnet valve device 86. This circuit extends from the positive bus wire 24 by way of a branch wire 115, a wire 116 including in series relation therein contact $d$ of relay 79 and the winding 104 of the magnet valve device 86 to a wire 117 which is, in turn, connected to the negative bus wire 25.

The magnet valve device 86 is accordingly operated to cause air under pressure to be supplied at a controlled rate from the reservoir 12 to the volume reservoir 96, thereby to cause opening of the timing switch 85 at the expiration of a certain length of time, such as two minutes.

The contact $e$ of the relay 79 is effective in its picked-up or closed position to establish a circuit for energizing the winding of the relay 76 and for charging the condenser 78. This circuit extends from positive bus wire 24 by way of the branch wire 115, contact $e$ of relay 79, a wire 118 including the back contact $b$ of relay 75, through the parallel-connected winding W of relay 76 and the condenser 78 to a wire 119 that is connected to the negative bus wire 25.

The condenser 78 is accordingly charged to a voltage corresponding to the battery voltage impressed on the bus wires 24 and 25 and the contacts of the relay 76 are, at substantially the same time actuated to their respective picked-up positions.

The contact $a$ of the relay 76 is effective in its picked-up or closed position to establish a circuit for energizing the winding W of the relay 75 and for charging the condenser 77. This circuit extends from the positive bus wire 24 by way of a branch wire 121, a second branch wire 122 including the contact $a$ of the relay 76, the parallel connected winding W of relay 75 and condenser 77, and a wire 123 to the negative bus wire 25. The condenser 77 is accordingly charged to the voltage impressed on the bus wires 24 and 25 and the contacts of the relay 75 are substantially simultaneously actuated to their respective picked-up positions.

The back contact $b$ of relay 75 is effective in its picked-up position to open the circuit for energizing the winding W of the relay 76 and for charging the condenser 78. The contacts of the relay 76 are not, however, restored at once to their dropped-out position because the condenser 78 discharges current locally through the winding W of the relay 76, thereby holding the contacts of the relay in their picked-up positions for a certain length of time, such as two or three seconds.

Upon the restoration of the contacts of the relay 76 to their dropped-out position, a circuit is established for energizing the winding 33 of the magnet valve device 13a. This circuit extends from the positive bus wire 24 by way of the wire 121, serially-connected contact $b$ of relay 76 and contact $a$ of relay 75, a wire 125, the magnet winding 33 of the magnet valve device 13a, and wire 117 to the negative bus wire 25.

The magnet valve device 13a is accordingly operated to cause air under pressure to be supplied from the reservoir 12 to the horn 11 to cause the horn to produce an audible signal or blast during the time that air continues to be supplied to the horn.

Contact $a$ of relay 76 is effective when restored to its dropped-out or open position to interrupt the circuit for energizing the winding W of the relay 75 and for charging the condenser 77. Like the relay 76, the relay 75 is not immediately restored to its dropped-out position but is maintained picked-up by the current discharged locally from the condenser 77 through the winding of the relay 75. After a certain interval of time, such as two or three seconds, the current discharged from the condenser 77 through the winding of the relay 75 diminishes sufficiently to cause restoration of the contacts of the relay 75 to their dropped-out position.

Restoration of the contact $a$ of relay 75 to its dropped-out or open position interrupts the circuit for energizing the magnet winding 33 of the magnet valve device 13a. The magnet valve device 13a is accordingly operated to cut-off the supply of air under pressure to the horn 11 and the signal produced by the horn is thus terminated.

The contact $b$ of relay 75 is effective when restored to its dropped-out or closed position to re-establish the circuit for energizing the winding of relay 76 and for charging the condenser 78. The contacts of relay 76 are accordingly picked-up and the condenser 78 is charged. Pick-up of the relay 76 causes energization of the winding of the relay 75 and charging of the condenser 77 in the manner previously described. Pick-up of the contacts of the relay 75 interrupts the circuit for energizing the winding of the relay 76 and for charging the condenser 78. After a certain length of time, such as two or three seconds, the contacts of relay 76 are again restored to their dropped-out position in which the circuit for energizing the magnet winding 33 of the magnet valve device 13a is again established in the manner previously described.

It will thus be apparent that the coding relays 75 and 76 continue to be alternately picked-up and dropped-out, in the manner previously described to cause the magnet winding of the magnet valve device 13a to be alternately energized and de-energized for approximately the same length of time, namely two or three seconds, thereby causing the horn 11 to be periodically operated to produce audible signals of two or three seconds duration as long as the control relay 79 remains picked-up.

The control relay 79 remains picked-up until such time as the self-holding circuit for the winding $b$ thereof is interrupted due to the opening of the timing switch 85. As previously explained, the timing switch 85 is opened upon the expiration of a certain length of time, such as two minutes, following the initial energization of the magnet winding 104 of the magnet valve device 86 which occurs in response to the initial pick-up of the control relay 79.

Upon the restoration of the control relay 79 to its dropped-out position, operation of the coding relays 75 and 76 is terminated due to the interruption of the circuit including the contact $e$ of the relay 79. Consequently, with the two coding relays 75 and 76 in their respective dropped-out positions, the circuit for energizing the magnet winding of the magnet valve device 13a is interrupted and remains interrupted at the contact $a$ of the relay 75.

The restoration of the contact $d$ of the relay 79 to its dropped-out or open position interrupts the circuit for energizing the magnet winding 104 of the magnet valve device 86. The magnet valve device 86 is accordingly operated to the position shown in the drawings in which the supply of air under pressure from the reservoir 12 to the volume reservoir 96 is terminated and the air under pressure in the volume reservoir 96 is exhausted to atmosphere through the exhaust port 106 of the magnet valve device 86.

Upon the sufficient exhaust of air under pressure from the volume reservoir 96, the spring 90 returns the piston 91 downwardly into seated position on the annular rib seat 94, thereby reengaging the contacts of the timing switch 85. It will be apparent that the reclosing of the timing switch 85 is not effective to cause the relay 79 to be again picked-up because the contact c of the relay 79 has been previously restored to its dropped-out or open position.

If the local operator desires to cause operation of the horn 11 to produce a coded "air raid" signal, he may do so merely by momentarily closing the push button switch 81, thereby energizing the winding b of the relay 79 and causing the contacts of the relay to be actuated to their picked-up position, in which the contact c is effective to establish the self-holding circuit for the winding b of the relay. Thereafter the push button switch 81 may be opened and the relay 79 remains in its picked-up position.

In view of the fact that the operation of the system is the same as previously described once the relay 79 is picked-up, it is not necessary to repeat a description of such operation.

Let it now be supposed that the operator at the remote control station desires to cause operation of the horn 11 to produce an "all clear" signal. To do so he causes the winding a of the control relay 80 to be energized and the contacts of the relay accordingly actuated to the picked-up position. The self-holding circuit for the winding b of relay 80 is accordingly established by contact c of relay 80 in its picked-up or closed position, and thereafter the winding a of the relay 80 may be deenergized without causing the contacts of the relay to be restored to their dropped-out position.

The contact d of the relay 80 is effective in its picked-up or closed position to establish a circuit for energizing the magnet winding 104 of the magnet valve device 86. This circuit extends from the positive bus wire 24 by way of the branch wire 121, contact d of the relay 80, wire 116, magnet winding 104 of magnet valve device 86, and wire 117 to the negative bus wire 25. The magnet valve device 86 is accordingly operated to cause air under pressure to be supplied at a rate controlled by choke device 87 from the reservoir 12 to the volume reservoir 96 as long as the relay 80 remains picked-up.

The contact e of the relay 80 is effective in its picked-up or closed position to establish a circuit for energizing the winding of the relay 75 and charging the condenser 77. This circuit extends from the positive bus wire 24 by way of the branch wire 121, a wire 127 including the contact e of the relay 80, wire 122, the parallel connected winding W of relay 75 and condenser 77, and wire 123 to the negative bus wire 25. The condenser 77 is accordingly charged and the contacts of the relay 75 are actuated to their picked-up position.

The contact a of the relay 75 is effective in its picked-up or closed position to establish the circuit for energizing the magnet winding 33 of the magnet valve device 13a, which circuit has been previously traced. The magnet valve 13a is accordingly operated to cause air under pressure to be supplied from the reservoir 12 to the horn 11 to cause it to operate to produce its audible signal.

In this instance, however, the relay 76 remains in its dropped-out position and the relay 75 remains in its picked-up position as long as the relay 80 remains in its picked-up position. Accordingly, the magnet valve device 13a causes air under pressure to be supplied continuously to the horn 11 until such time as the relay 80 is restored to its dropped-out position as a result of the interruption of the self-holding circuit of the winding b of relay 80 due to the opening of the timing switch 85.

As in the case of an "air raid" signal, the timing switch 85 is actuated to its open position at the expiration of a certain time, such as two minutes, following the initial pick-up of the relay 80. It will accordingly be seen that the horn 11 continues to produce a continuous audible signal for a predetermined length of time, such as two minutes, to indicate the "all clear" signal.

Upon the interruption of the self-holding circuit for the winding b of relay 80 due to the opening of the timing switch 85, the contacts of the relay 80 are restored to their dropped-out position. The contact d of relay 80 is effective in its dropped-out or open position to interrupt the circuit for energizing the magnet winding 104 of the magnet valve device 86. Magnet valve device 86 is thus operated to cut-off the supply of air under pressure to the volume reservoir 96 and to cause air under pressure to be exhausted from the volume reservoir 96 to atmosphere through the exhaust port 106. Upon sufficient reduction of the pressure in the volume reservoir 96, the timing switch 85 is restored to its closed position.

Contact e of the relay 80 is effective in its dropped-out position to interrupt the circuit for energizing the winding W of the relay 75. After a certain length of time, such as two or three seconds, during which the condenser 77 discharges current through the winding of the relay 75, the contacts of the relay 75 are restored to their dropped-out position. The restoration of the contact a of the relay 75 to its dropped-out or open position interrupts the circuit for energizing the magnet winding 33 of the magnet valve device 13a. The magnet valve device 13a is thus operated to cut-off the supply of air under pressure from the reservoir 12 to the horn 11 which accordingly ceases to produce the audible signal.

If the local operator desires to cause operation of the horn 11 to produce the "all clear" signal, he may do so merely by momentarily closing the push button switch 82. Momentary closure of the switch 82 causes pick-up of the relay 80 which is accordingly "stuck-up" thereafter by the self-holding circuit of the relay. Operation of the system is thereafter the same as that, previously described, initiated by an operator at a remote control station and is accordingly not repeated.

*System shown in Figure 7*

The air raid warning system shown in Fig. 7 is for the most part identical with that shown in Fig. 6, differing therefrom in the omission of the two coding relays 75 and 76 and the two condensers 77 and 78 and the substitution therefor of a single coding relay 75A, an electrical condenser 77A, and three adjustable resistors 131, 132, and 133, respectively.

Those parts of the system shown in Fig. 7 which correspond identically to corresponding parts in the system shown in Fig. 6 are identified by the same reference numerals without further description.

The coding relay 75A is of the direct-current neutral type having two separate windings a and b, two front contacts c and d, and a back contact e.

*Operation of system shown in Figure 7*

Let it be assumed that the operator at the remote control station desires to cause operation of the horn 11 to produce an "air raid" signal and accordingly causes the winding a of the relay 79 to be energized momentarily. Contact c of the relay 79 is effective in its picked-up position to establish the self-holding circuit for the winding b of the relay 79 to maintain the relay picked-up notwithstanding subsequent deenergization of the winding a of the relay 79.

The contact d of the relay 79 is effective in its picked-up or closed position to establish a circuit for energizing the magnet winding 104 of the magnet valve device 86 in exactly the same manner as in the system shown in Fig. 6. The magnet valve device 86 is accordingly operated to cause air under pressure to be supplied from the reservoir 12 to the volume reservoir 96 of the timing switch 85 at a controlled rate determined by the choke device 87.

Contact e of the relay 79 is effective in its picked-up position to establish a circuit for energizing the winding a of the coding relay 75A and for charging the condenser 77A. This circuit extends from the positive bus wire 24 by way of the branch wire 115, contact e of the relay 79, a wire 135, back contact e of the coding relay 75A, resistor 131, a wire 136 to the point 137 where the circuit divides into two parallel branches, one branch including the condenser 77A and the other branch including the resistor 132 and the winding a of the coding relay 75A, the two branches rejoining at the point 138, thence by way of a wire 139 and a wire 141 to the negative bus wire 25.

The condenser 77A is accordingly charged and the contacts of the relay 75A actuated to their picked-up positions.

The back contact e of the relay 75A is effective in its picked-up or open position to interrupt the energizing circuit for the winding a of the relay 75A and the charging circuit for the condenser 77A. The contacts of the relay 75A are not immediately restored to their dropped-out position, however, because the condenser 77A discharges current locally through resistor 132 and winding a of the relay 75A as well as through the winding b of the relay 75A and the resistor 133.

The contact c of the coding relay 75A is effective in its picked-up position to establish the circuit including the winding b of the relay 75A and the resistor 133 in the manner readily apparent in the drawings.

The resistors 132 and 133 may be adjusted in value to so control the current discharged from condenser 77A to the respective windings a and b of the relay 75A as to vary the time that the contacts of the relay remain held in their picked-up position due to the current discharged from the condenser. They may be so adjusted, for example, as to cause the contacts of the relay 75A to remain in their picked-up positions for at least three seconds following the pick-up of the relay contacts.

The contact d of the relay 75A is effective in its picked-up or closed position to establish a circuit for energizing the magnet winding 33 of the magnet valve device 13a. This circuit extends from the positive bus wire 24 by way of the branch wire 121, a wire 143 including the contact d of the relay 75A, magnet winding 33 of the magnet valve device 13a, and the wire 117 to the negative bus wire 25.

The magnet valve device 13a is accordingly operated as in the system of Fig. 6 to cause air under pressure to be supplied to the horn 11 to cause an audible signal to be produced as long as the magnet winding 33 thereof is energized.

Upon the restoration of the contacts of the relay 75A to their dropped-out position, contact e of relay 75A is effective to reestablish the circuit for energizing the winding a of the relay 75A and for charging the condenser 77A. The resistor 131 in the circuit, functions to delay for a certain length of time such as two or three seconds the pick-up of the contacts of the relay. During this interval of time the contact c of the relay 75A is in open position interrupting the circuit for the magnet winding of the magnet valve device 13a. During such interval of time, the magnet valve device 13a accordingly cuts-off the supply of air under pressure to horn 11, thereby causing cessation of the audible signal.

When the contacts of the relay 75A are again picked-up, the circuit for energizing the magnet winding of the magnet valve device 13a is again established for the interval of time corresponding to the time that the contacts of the relay 75A remain held in their picked-up position by the current discharged from the condenser 77A.

It will thus be apparent that as long as the relay 79 remains picked-up, the coding relay 75A will be alternately picked-up and dropped-out to cause the magnet valve device 13a to be operated in such a manner as to alternately supply and cut-off the supply of air to the horn 11, thereby causing the horn to produce periodic blasts in substantially the same manner as in the system of Fig. 6.

Upon the expiration of a certain length of time, such as two minutes, the timing switch 85 opens and accordingly interrupts the self-holding circuit for winding b of the relay 79, thereby causing restoration of the contacts of the relay 79 to their dropped-out position.

The magnet winding of the magnet valve 86 is accordingly deenergized and the magnet valve operated to terminate the further supply of air under presure to the timing switch and to cause an exhaust of air under pressure from the volume reservoir 96 whereby the timing switch 85 is restored to its closed position.

At the same time, the restoration of the contact e of the relay 79 to its dropped-out or open position causes the coding relay 75A to cease further operation and remain in its dropped-out position wherein the circuit for energizing the magnet winding of the magnet valve device 13a is interrupted.

It will accordingly be seen that the system operates automatically in response to the pick-up of the relay 79 to cause operation of the horn 11 to produce periodic audible signals for a certain length of time, such as two minutes.

An "air raid" signal may also be initiated by a local operator momentarily closing the pick-up switch 81 just as in the system of Fig. 6.

If the operator at a remote control station desires to cause operation of the horn 11 to produce the "all clear" signal, he may initiate such operation by causing momentary energization of the winding a of the relay 80. Once the contacts of the relay 80 are actuated to their picked-up position the self-holding circuit for the winding b of the relay is established by the contact c thereof as in the system of Fig. 6.

The contact $d$ of the relay 80 is effective in its picked-up or closed position to establish the circuit for energizing the magnet winding 104 of the magnet valve device 86. The magnet valve device 86 is accordingly operated to cause air under pressure to be supplied from the reservoir 12 to the volume chamber 96 of the timing switch 85 at a controlled rate determined by the choke device 87.

Contact $e$ of the relay 80 is effective in its picked-up or closed position to establish a circuit for energizing the winding $a$ of the coding relay 75A as well as for charging the condenser 77A. This circuit extends from the positive bus wire 24 by way of the wire 121, a branch wire 147 including the contact $e$ of the relay 80 to the wire 136 at the point 137, thence through the two parallel branches including respectively the condenser 77A and resistor 132 and winding $a$ of relay 75A to the point 138, and thence by wires 139 and 141 to the negative bus wire 25.

The coding relay 75A is accordingly picked-up and maintained picked-up as long as the relay 80 remains picked-up.

The magnet winding of the magnet valve device 13$a$ is accordingly continuously energized as long as the relay 75A is picked-up to cause air under pressure to be supplied to the horn 11 by the magnet valve device 13$a$.

When the timing switch 85 is opened at the expiration of a certain time, such as two minutes, following the initial pick-up of the relay 80 to effect the interruption of the self-holding circuit of the relay and the consequent restoration of the contacts of the relay to their dropped-out position, the circuits for energizing the magnet windings of the magnet valve devices 86 and 13$a$ are accordingly interrupted and further operation of the horn terminated just as in the system of Fig. 6.

The contacts of the relay 75A will be maintained picked-up for a certain short interval of time, such as occurs during an "air raid" signal due to the discharge of the current from the condenser 77A through the windings $a$ and $b$ of the relay following the restoration of the contact $e$ of the relay 80 to its dropped-out or open position. Actually, therefore, the horn 11 continues to produce an audible signal for a short interval of time of the order of several seconds following the drop-out of the relay 80.

The local operator may initiate an "all clear" signal operation of the horn 11 merely by momentarily closing the push button switch 82, just as in the system of Fig. 6.

Summary

Summarizing, it will be seen that I have disclosed several embodiments of an air raid warning system, all of which are automatically operative to cause any selected one of a plurality of coded signals to be produced by an audible signal device, such as an air operated horn. All of the systems described, moreover, are effective to cause the signal device to operate to produce a selected coded signal for a certain length of time, such as two minutes, in response to a momentary control impulse or operation.

In one embodiment, a combination coding and timing apparatus driven by an electric motor is provided.

In the other embodiments, a pneumatic timing switch mechanism is provided which is set in operation in response to the initiating momentary control impulse for timing the duration of the signal sequence. In one of the latter two embodiments, two cooperating coding relays are provided effective to cause intermittent operation of the horn. One of these relays is effective upon operation to produce a continuous operation of the horn.

In the other of the last two mentioned embodiments, a single coding relay is provided, which is alternately picked-up and dropped-out, at one time, to cause intermittent operation of the horn and which is continuously picked-up to cause continuous operation of the horn, at another time, dependent upon the particular signal selected.

Having now described my invention, what I claim as new and desire to secure by Letters Patent, is:

1. In a signal system having a signal device, the combination of two electrical relays, each of said relays having two separate windings, one of which is effective when energized to cause pick-up of the relay and the other of which is effective when energized to maintain said relay picked-up, means responsive to the pick-up of each of said relays for establishing a self-holding circuit including the said other winding of the corresponding relay whereby to maintain the corresponding relay picked-up, means set in operation in response to the pick-up of one of said relays for causing operation of said signal device to produce one certain signal so long as said relay is picked-up, means set in operation in response to the pick-up of the other of said relays to cause operation of said signal device to produce a different signal so long as said other relay is picked-up, and timing means set in operation in response to the pick-up of either of said relays for interrupting the self-holding circuit for either of said relays and effecting the consequent restoration of the relays to their dropped-out position at the expiration of a certain length of time.

2. In a signal system having a signal device, the combination of two electrical relays each having a winding effective upon energization to cause pick-up of the relay, means effective in response to pick-up of each of said relays for causing continued energization of the winding of the corresponding relay whereby to maintain the relay picked-up, means automatically operative as long as one of said relays is picked-up for causing operation of said signal device to produce one certain signal, means operative so long as the other of said relays is picked-up to cause operation of said signal device to produce a certain different signal, and pneumatic timing means set in operation in response to pick-up of either of said relays for effecting deenergization of the winding of the corresponding relay and the consequent restoration thereof to its dropped-out position at the expiration of a certain length of time following the initial pick-up of the relay.

3. In a signal system having a signal device, the combination of a control relay having a winding effective when energized to cause pick-up of the relay, means effective in response to pick-up of said control relay for causing continued energization of the winding of said control relay to maintain it picked-up, a coding relay, means effective as long as said control relay is picked-up for causing said coding relay to be alternately picked-up and dropped-out at predetermined intervals, means controlled by said coding relay for causing said signal device to be operated periodically, and timing means set in operation in response to the pick-up of said control relay for effecting deenergization of the winding of said control relay and the consequent restoration of the relay to its dropped-out position at the expiration of a certain length of time following the pick-up of the control relay, whereby to terminate the alternate pick-up and drop-out of said coding relay and the consequent periodic operation of said signal device.

4. In a signal system having a signal device, the combination of two selectively operable control devices, a coding relay, means responsive to operation of one of said control devices for causing said coding relay to be alternately picked-up and dropped-out repeatedly for predetermined lengths of time respectively, means responsive to the operation of the other of said control devices for causing said coding relay to be continuously picked-up, means controlled by said coding relay and effective to cause operation of said signal device only while said relay is picked-up, and means for restoring said coding relay to its dropped-out position following the operation of either of said control devices so as to terminate the operation of said signal device.

5. In a signal system having a signal device, the combination of two selectively operable control devices, a coding relay, means responsive to operation of one of said control devices for causing said coding relay to be alternately picked-up and dropped-out repeatedly for predetermined lengths of time respectively, means responsive to the operation of the other of said control devices for causing said coding relay to be continuously picked-up, means controlled by said coding relay and effective to cause operation of said signal device only while said relay is picked-up, and timing means set in operation in response to the operation of either of said control devices and effective at the expiration of a certain length of time following the operation of either of the said control devices for restoring said coding relay to its dropped-out position so as to terminate the operation of said signal device.

6. In a signal system having a signal device, the combination of two relays each of which has a winding selectively energizable under the control of an operator for effecting pick-up of the relay, means effective in response to the pick-up of each of said relays to cause continued energization of the winding of the relay whereby to maintain the relay picked-up, a coding relay, means effective while one of said relays is picked-up for causing said coding relay to be alternately picked-up and dropped-out repeatedly for predetermined lengths of time respectively, means effective while the other of said two relays is picked-up for causing said coding relay to be continuously picked-up, means controlled by said coding relay and effective in response to the alternate pick-up and drop-out of the coding relay to cause periodic operation of said signal device and also operative in response to the continued pick-up of said coding relay for causing continuous operation of said signal device, and timing means set in operation in response to the pick-up of either of said two relays effective to cause deenergization of the winding of the picked-up relay at the expiration of a certain length of time whereby to cause restoration of said coding relay to its dropped-out position and the consequent termination of the operation of said signal device.

7. In a signal system, the combination of an air operated signal device effective to produce an audible signal upon the supply of air under pressure thereto, a source of air under pressure, electroresponsive valve means operative only while energized to cause air under pressure to be supplied from said source to said air operated signal device, a volume reservoir, an electroresponsive valve device effective while deenergized to vent said volume reservoir to atmosphere and operative only while energized to cause air under pressure to be supplied at a controlled rate from said source to said volume reservoir to cause an air pressure exceeding a certain value to be built-up therein only after the elapse of a certain length of time following initiation of the supply of air to said volume reservoir, means operative to effect periodic energization of said electroresponsive valve means and the consequent supply of air under pressure by said electroresponsive valve means to said air operated signal device periodically to thereby cause said signal device to produce a predetermined signal, means effective while the last said means is operative for causing continued energization of said electroresponsive valve device and the consequent continued supply of air under pressure by said electroresponsive valve device to said volume reservoir, and a pressure operated switch device responsive to an air pressure in said volume reservoir exceeding said certain value for causing deenergization of said electroresponsive valve means and deenergization of said electroresponsive valve device.

CLAUDE M. HINES.